INVENTORS
WILLIAM L. TANCRED
JOSEPH A. RICHARDS

ATTORNEY

Jan. 12, 1971    W. L. TANCRED ET AL    3,554,051
DECADE COUNTER OR THE LIKE

Filed June 27, 1969    2 Sheets-Sheet 2

INVENTORS
WILLIAM L. TANCRED
JOSEPH A. RICHARDS
BY
ATTORNEY

United States Patent Office 3,554,051
Patented Jan. 12, 1971

3,554,051
DECADE COUNTER OR THE LIKE
William L. Tancred, Pacoima, and Joseph A. Richards, North Hollywood, Calif., assignors to International Telephone and Telegraph Corporation, New York, N.Y., a corporation of Delaware
Filed June 27, 1969, Ser. No. 837,258
Int. Cl. G05g 5/06; G06c 7/10
U.S. Cl. 74—527                              10 Claims

ABSTRACT OF THE DISCLOSURE

A pawl and ratchet arrangement for use between a decade counter number wheel and gear wheel to permit reset.

BACKGROUND OF THE INVENTION

This invention relates to decade counters or the like and, more particularly, to a number wheel, a gear wheel, and a detent for reset.

In the past, a decade counter number wheel has been held relative to a gear wheel by two tiny helical springs and detents. The number wheel has had internal notches around its periphery disposed between inwardly extending radial projections. The gear wheel then carries the detents which ride in between the projections.

The above-described prior art structures have several serious disadvantages. The projections cause the number wheel moment of inertia to be relatively high. This decreases maximum operating speed and causes excessive wear. The use of the detents and springs also requires a large number of component parts so small that they are difficult and expensive to assemble.

SUMMARY OF THE INVENTION

In accordance with the device of the present invention, the above-described and other disadvantages of the prior art are overcome by providing a number wheel and gear wheel, and a star-shaped ratchet fixed to one wheel hub. Detent means are then connected to the other wheel. Utilizing the ratchet on the hub reduces the moment of inertia of the wheel. The wheels are, thus, capable of operating at high speeds without excessive wear. Further, the ratchet may be an integral portion of the one wheel. The detent means may be a single piece of molded plastic. Thus, this reduces the number of component parts. Further, the detent means is relatively large and is easy and inexpensive to assemble.

The above-described and other advantages of the invention will be better understood from the following description when considered in connection with the accompanying drawings.

BRIEF DESCRIPTION OF THE DRAWINGS

In the drawings, which are to be regarded as merely illustrative.

DESCRIPTION OF THE PREFERRED EMBODIMENT

Figure 1:
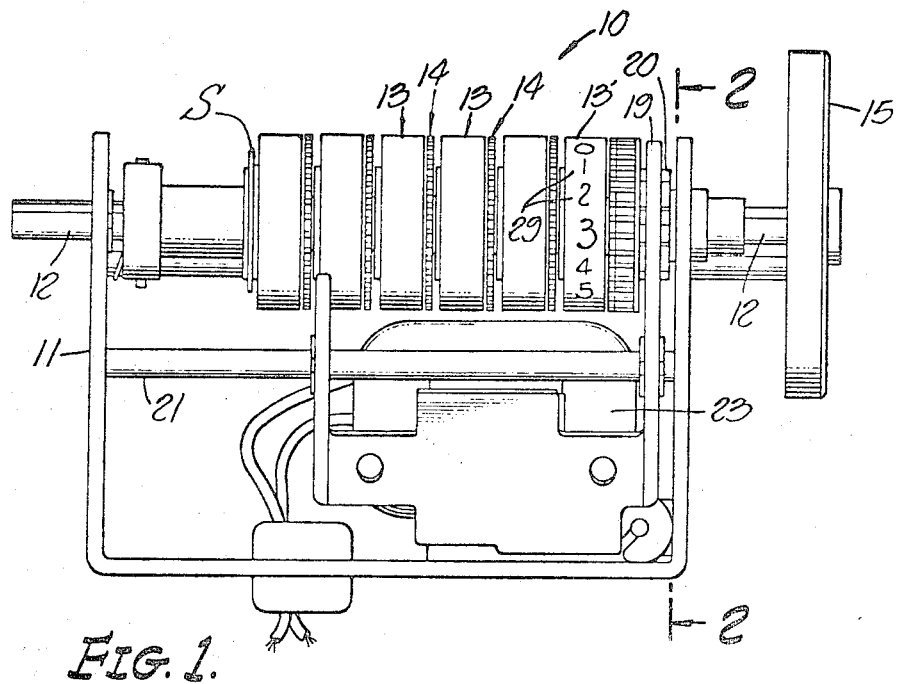
FIG. 1 is a front elevational view of a decade counter constructed in accordance with the present invention.
Figure 7:
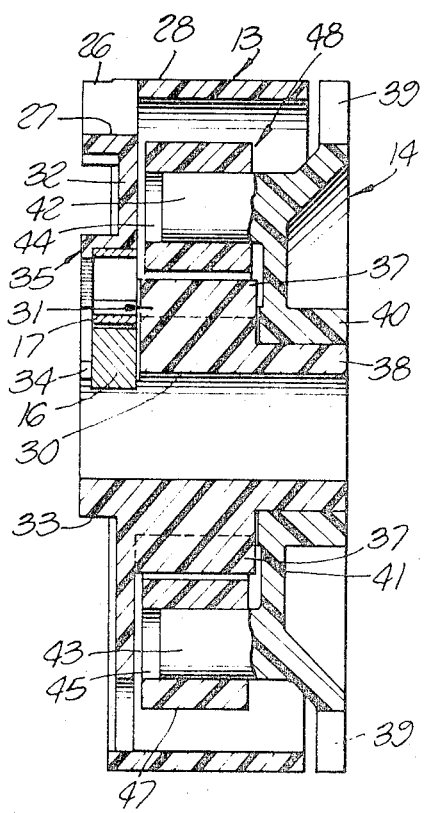
FIG. 7 is a vertical sectional view through a number wheel and gear wheel.

A decade counter 10 is indicated in FIG. 1, including a frame 11 through which a shaft 12 is positioned. Shaft 12 is rotatable in frame 11. Number wheels 13 are rotatable about shaft 12. The same is true of gear wheels 14. The units number wheel is indicated at 13'. All of the gears 14 are driven by the same kind of mechanism. The mechanism may be entirely conventional, if desired. The mechanism driving units wheel 13' may also be entirely conventional. Number wheels 13 may be reset to zero by turning knob 15 which is fixed to shaft 12. The manner in which reset is accomplished is that each number wheel, such as number wheel 13 as shown in FIG. 7, has a detent 16 which is biased by a spring 17 shown in FIGS. 8 and 9 so that detent 16 is urged into an axial groove 18 in shaft 12 as shown in FIG. 2.

Figure 2:
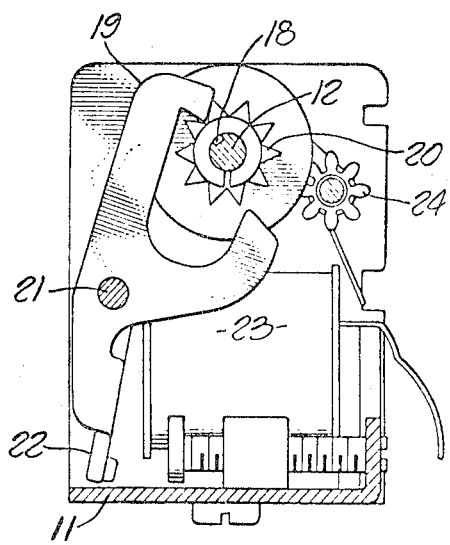
FIG. 2 is a sectional view of the counter taken on the line 2—2 shown in FIG. 1.

Units wheel 13 is advanced by a mechanism shown in FIG. 2, including pawl 19 and a ratchet 20. Pawl 19 is pivoted about shaft 21 fixed to frame 11. An armature 22 is fixed to pawl 19 and is attracted by solenoid 23.

Figure 3:
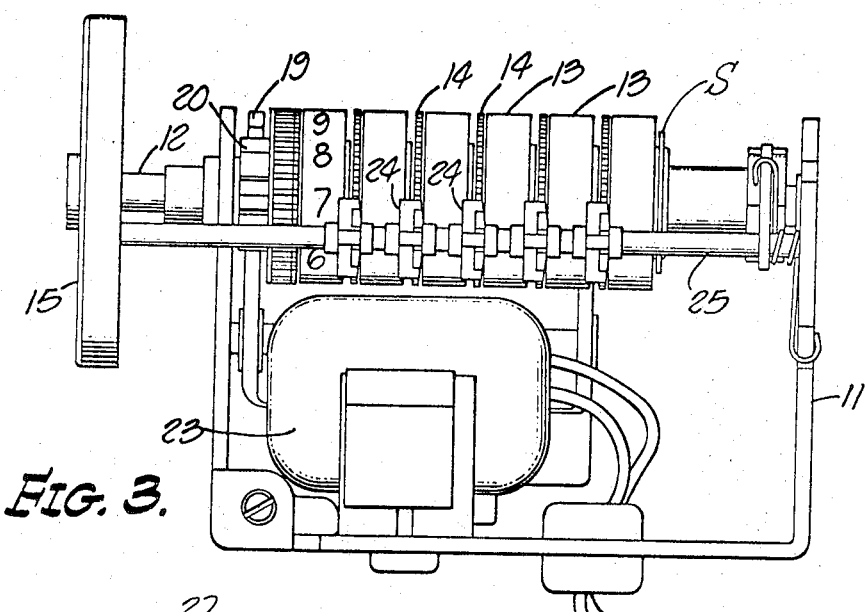
FIG. 3 is a rear elevational view of the counter.

Each number wheel carries two gear teeth, of twenty, adjacent a gear wheel 14. It is by this mechanism that one complete revolution of one number wheel causes the next succeeding number wheel to advance one digit. The two gear teeth, of twenty, drive the next succeeding gear wheel 14 through a pinion. Such pinions are indicated at 24 in FIG. 3. Pinions 24 are rotatably mounted on shaft 25 mounted on frame 11.

Figure 4:
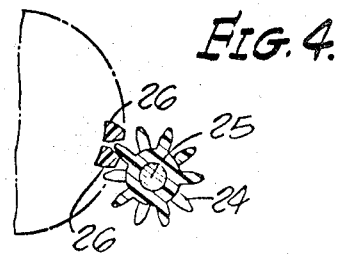
FIGS. 4, 5, and 6 are sectional views illustrating the Geneva movement in the counter.
Figure 5:
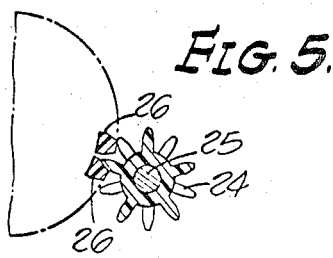
Figure 6:
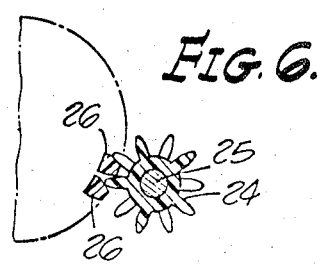

The Geneva teeth are indicated at 26 in FIGS. 4, 5, and 6. Alternate teeth of pinions 24 are shorter than the others. Thus, a pinion 24 turns only when the long tooth is allowed to mesh in between Geneva teeth 26. Otherwise, two of the long teeth rest on the outside surface of the number wheel. The number wheel is cut away at 27 as shown in FIG. 7 to allow the long tooth to enter between the Geneva teeth.

All of the structures of the decade counter 10 shown in FIG. 1 may be entirely conventional except for the component parts shown in FIG. 7. Number wheel 13 has a cylindrical portion 28 which carries numbers as indicated at 29 in FIG. 1. Number wheel 13 also has a hub 30 which has a star-shaped ratchet 31. A web 32 connects hub 30 and portion 28.

As shown in FIG. 7, hub 30 has an axially projecting portion 33 which is notched out at 34. Detent 16 is movable into and out of notch 34.

Figure 8:
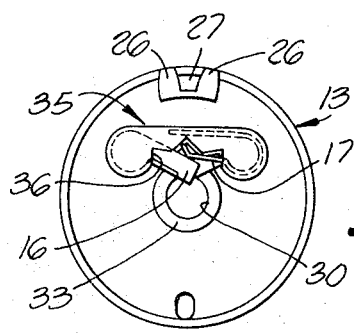
FIG. 8 is a front elevational view of the number wheel.

Number wheel 13 has a housing portion 35 which has the appearance of an embodiment in FIG. 8. Housing portion 35 retains detent 16 and spring 17, ratchet 31 being disposed on one side of the latter two. Housing portion 35 is more or less elongated with rounded ends, as shown in FIG. 8. Housing portion 35 is cut out at notches 36 which lies in registration with teeth 37 of ratchet 31 as shown in FIG. 9.

As shown in FIG. 7, hub 30 also has a projection 38. Gear wheel 14 has teeth 39. Hub 40 is connected to teeth 39 by a web 41. Number wheel 13 and gear wheel 14 are rotatable relative to each other, hub 40 being rotatable about projection 38 of hub 30.

Figure 10:
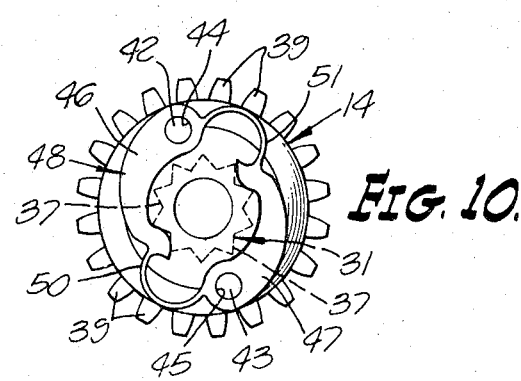
FIG. 10 is a rear elevational view of the gear wheel.

Gear wheel 14 has two projections 42 and 43 fixed thereto which extend respectively into holes 44 and 45 of pawl portions 46 and 47 respectively of detent means 48 shown in FIG. 10.

Figure 9:
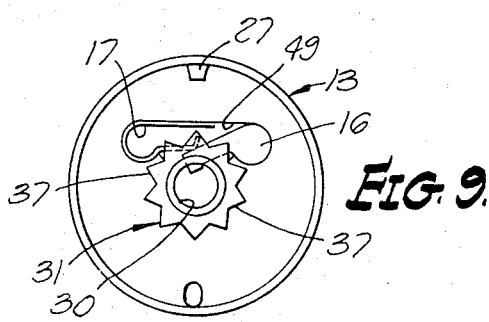
FIG. 9 is a rear elevational view of the number wheel.

The outline of the interior of housing portion 35 is indicated at 49 in FIG. 9.

The manner in which pawl projections 46 and 47 engage ratchet 31 is illustrated in FIG. 10.

Although the device of the present invention is not limited to the use of any specific materials, preferably spring 17 will be made of spring metal, and all of the structures with exception of spring 17 shown in FIGS. 7, 8, 9, and 10 may be made of plastic. It is an outstanding feature of the invention that detent means 48 is made entirely of plastic and in one piece. Note will be taken that detent means 48 has U-shaped springs 50 and 51.

Pairs of number and gear wheel may be stacked together axially on shaft 12. A snap ring S may be employed to hold them together as shown in FIG. 1. Other conventional means may also be provided.

Note will be taken that the location of projections 42 and 43 may be located on number wheel 13 and ratchet 31 may be located on gear wheel 14.

In the operation of the device of the present invention, as illustrated, gear wheel 14 may drive number wheel 12 one digit of each revolution of the immediately preceeding number wheel. In the case of units wheel 13', the number wheel will rotate one-tenth of a revolution for each digit. Gear wheel 14 will drive number wheel 13 because detent means 48 will grip ratchet 31, and gear wheel 14 will turn detent means 48 because projections 42 and 43 lie inside holes 44 and 45, respectively.

Should it be desired that the cylinder be reset, pawl 19 will hold gear wheel 14 in a substantially fixed position. Knob 15 will then be rotated until groove 18 picks up detent 16. Number wheel 13 will then be rotated relative to gear wheel 14. This relative rotation will be permitted because pawl portions 46 and 47 will expand against the restraining pressure of springs 50 and 51 to allow rotation of ratchet teeth 37 beneath the pawls.

FIG. 7 is a vertical section through number wheel 13 looking to the left, as shown in FIG. 8. The complete assembly of FIG. 7 would, thus, result in placing number wheel 13 in the position shown in FIG. 8 over detent means 48 in the position shown in FIG. 10. During reset, rotation of shaft 12 will, thus, cause ratchet 31 to rotate to the left as viewed in FIG. 10. Rotation of ratchet 31 to the left in FIG. 10 will more easily deflect pawl portions 46 and 47 than rotation in the opposite direction.

What is claimed is:

1. In a decade counter or the like, the combination comprising: a first wheel; a second wheel; means mounting said wheels in relative positions such that they are fixed axially relative to each other but that they both are rotatable about a common axis, said first wheel having a hub, said hub having a star-shaped ratchet, said ratchet having teeth pointed radially outward away from said axis; detent means biased against said ratchet in a position to hold said wheels yieldingly in fixed rotary positions relative to each other, said detent means being movable to allow rotation of one of said wheels relative to the other when a force is applied to the one and the other is held stationary; and means to hold said detent means in a substantially fixed position relative to said second wheel.

2. The invention as defined in claim 1, wherein said mounting means includes an axial projection fixed to the center of one wheel, the other wheel having a hole therethrough, said hole having a cylindrical internal surface concentric with said axis, said projection having an outer cylindrical surface concentric with said axis to fit contiguous to the hole surface rotatable thereagainst, said one wheel having a disc-shaped web fixed thereto at a position spaced axially from said other wheel, said other wheel also having a disc-shaped web spaced from said one wheel web, said ratchet teeth being located between said webs, said detent means including two pawls and spring means to bias said pawls into engagement with said ratchet between two opposite pairs of teeth, said pawls and said spring means being integral in one piece of resilient plastic, said pawls having pivot holes therethrough, said second wheel having a pair of projections parallel to said axis on opposite sides thereof spaced equal distances therefrom, said projections being located in said pawl holes, the movable end of each pawl being spaced a distance from the pivoted end of the other, said spring means including a leaf spring connected between the pivoted end of each pawl and the free end of the others, said plastic piece having a surface made by moving an axial line perpendicular to its length.

3. The invention as defined in claim 1, wherein one of said wheels has a disc-shaped web fixed at a position spaced axially from the other wheel, said other wheel also having a disc-shaped web fixed at a position spaced axially from the web of said wheel, said ratchet teeth being located between said webs, said detent means having a width approximately equal to the spacing between said webs, whereby said webs keep said detent means in place.

4. The invention as defined in claim 1, wherein said detent means includes a pawl mounted on said second wheel, and bias means to urge said pawl against said ratchet.

5. The invention as defined in claim 4, wherein said second wheel has an axial projection fixed thereto in a position spaced from said axis, said pawl having a hole through a pivoted end thereof, said projection extending through said hole, said bias means including a spring.

6. The invention as defined in claim 1, wherein said detent means includes two pawls, each pawl having a pivoted end disposed adjacent a free end of the other, and a leaf spring fixed between each pair of adjacent ends of said pawls, said pawls being pivoted from said second wheel.

7. The invention as defined in claim 6, wherein each wheel has a disc-shaped web, said pawls and said ratchet having the same thickness, said webs being positioned contiguous to the ends of said ratchet so as to confine said pawls.

8. The invention as defined in claim 7, wherein said leaf springs are U-shaped with the base of each U disposed radially outward from the ends of the legs thereof.

9. The invention as defined in claim 8, wherein both major surfaces of said springs are parallel, each said surface being described by an axial line moving perpendicular to its length.

10. The invention as defined in claim 9, wherein said pawls and said springs are integral parts of one piece of plastic.

References Cited

UNITED STATES PATENTS

| | | | |
|---|---|---|---|
| 1,471,306 | 10/1923 | Chase | 235—117 |
| 2,551,656 | 5/1951 | Breitenstein | 74—142 |
| 2,622,804 | 12/1952 | Hamisch | 74—126 |
| 3,061,191 | 10/1962 | Hultgren | 235—117 |
| 2,127,244 | 8/1938 | Berck | 235—117 |
| 3,116,875 | 1/1964 | Wolfenden et al. | 235—117 |
| 3,504,559 | 4/1970 | Shaw, Jr., et al. | 74—575 |

M. CARY NELSON, Primary Examiner

W. S. RATLIFF, Jr., Assistant Examiner

U.S. Cl. X.R.

235—142